United States Patent
Nikiforov (10) Patent No.: US 7,155,040 B2
(45) Date of Patent: Dec. 26, 2006

(54) GENERATION OF QUALITY FIELD INFORMATION IN THE CONTEXT OF IMAGE PROCESSING

(75) Inventor: Andrey Nikiforov, Edina, MN (US)

(73) Assignee: BIO-key International, Inc., Eagan, MN (US)

( * ) Notice: Subject to any disclaimer, the term of this patent is extended or adjusted under 35 U.S.C. 154(b) by 214 days.

(21) Appl. No.: 10/879,603

(22) Filed: Jun. 29, 2004

(65) Prior Publication Data

US 2005/0286801 A1    Dec. 29, 2005

(51) Int. Cl.
 *G06K 9/00* (2006.01)
(52) U.S. Cl. .................................. 382/125; 382/124
(58) Field of Classification Search ................ 382/125
See application file for complete search history.

(56) References Cited

U.S. PATENT DOCUMENTS

| | | | |
|---|---|---|---|
| 3,292,149 A | 12/1966 | Bourne | 382/126 |
| 3,959,884 A | 6/1976 | Jordan et al. | 283/69 |
| 3,968,475 A | 7/1976 | McMahon | 382/124 |
| 4,015,240 A | 3/1977 | Swonger et al. | 382/125 |
| 4,151,512 A | 4/1979 | Riganati et al. | 382/125 |
| 4,185,270 A | 1/1980 | Fischer II et al. | 382/125 |
| 4,607,384 A | 8/1986 | Brooks | 382/125 |
| 4,685,145 A | 8/1987 | Schiller | 382/272 |
| 4,790,564 A | 12/1988 | Larcher et al. | 283/69 |
| 4,896,363 A | 1/1990 | Taylor et al. | 382/125 |
| 4,947,442 A | 8/1990 | Tanaka et al. | 382/125 |
| 5,040,223 A | 8/1991 | Kamiya et al. | 382/127 |
| 5,105,467 A | 4/1992 | Kim et al. | 382/125 |
| 5,109,428 A | 4/1992 | Igaki et al. | 382/125 |
| 5,140,642 A | 8/1992 | Hsu et al. | 382/124 |
| 5,187,474 A | 2/1993 | Capello et al. | 382/124 |
| 5,239,590 A | 8/1993 | Yamamoto | 382/125 |
| 5,261,008 A | 11/1993 | Yamamoto | 382/127 |
| 5,363,453 A | 11/1994 | Gagne et al. | 382/125 |
| 5,420,937 A | 5/1995 | Davis | 382/125 |
| 5,497,429 A | 3/1996 | Shibuya | 382/125 |
| 5,572,597 A | 11/1996 | Chang et al. | 382/125 |
| 5,587,927 A * | 12/1996 | Nagao et al. | 702/167 |
| 5,631,971 A | 5/1997 | Sparrow | 382/125 |
| 5,659,626 A | 8/1997 | Ort et al. | 382/125 |
| 5,664,027 A | 9/1997 | Ittner | 382/170 |
| 5,841,888 A | 11/1998 | Setlak et al. | 382/124 |
| 5,901,239 A | 5/1999 | Kamei | 382/125 |
| 6,002,787 A | 12/1999 | Takhar et al. | 382/125 |
| 6,049,621 A | 4/2000 | Jain et al. | 382/125 |

(Continued)

OTHER PUBLICATIONS

Ratha, N. et al.; "Adaptive Flow Orientation based Feature Extraction in Fingerprint Images," Dept. of Computer Science, Michigan State University, Feb. 12, 1995, pp. 1-32.

(Continued)

*Primary Examiner*—Joseph Mancuso
*Assistant Examiner*—Alex Liew
(74) *Attorney, Agent, or Firm*—Christopher L. Holt; Westman, Champlin & Kelly, P.A.

(57) ABSTRACT

A computer-implemented method is provided for generating a quality field representation of a collection of image data. The method includes receiving the collection of image data and identifying a target point along a ridge in the collection of image data. A directional field representation is estimated by assigning an angle value to the ridge indicative of an angle with respect to a reference line. Also, a covariance between the target point and a corresponding point along a line orthogonal to the angle value is calculated.

7 Claims, 5 Drawing Sheets

U.S. PATENT DOCUMENTS

| | | | | |
|---|---|---|---|---|
| 6,072,895 | A | 6/2000 | Bolle et al. | 382/125 |
| 6,181,807 | B1 | 1/2001 | Setlak et al. | 382/124 |
| 6,226,391 | B1 | 5/2001 | Dydyk et al. | 382/125 |
| 6,241,288 | B1 | 6/2001 | Bergenek et al. | 283/67 |
| 6,282,302 | B1 | 8/2001 | Masanori | 382/116 |
| 6,289,112 | B1 | 9/2001 | Jain et al. | 382/116 |
| 6,466,686 | B1* | 10/2002 | Senior | 382/124 |
| 6,233,348 | B1 | 5/2004 | Fujii et al. | 382/125 |
| 2002/0030359 | A1 | 3/2002 | Bergenek et al. | 283/68 |
| 2002/0031245 | A1 | 3/2002 | Rosenberg et al. | 382/125 |
| 2002/0041700 | A1 | 4/2002 | Therbaud | 382/124 |
| 2005/0129293 | A1* | 6/2005 | Acharya et al. | 382/125 |

OTHER PUBLICATIONS

Practical Image Processing in C. By Craig A. Lindley Published by John Wiley & Sons, Inc. 1991. (copy of book cover only).

U.S. Appl. No. 09/788,148, filed Feb. 16, 2001.

Office Action dated Apr. 20, 2004, for U.S. Appl. No. 09/788, 148, filed Feb. 16, 2001.

Amendment filed Oct. 13, 2004, for U.S. Appl. No. 09/788,148, filed Feb. 16, 2001.

Office Action mailed Apr. 7, 2005, for U.S. Appl. No. 09/788,148, filed Feb. 16, 2001.

Office Action mailed Sep. 28, 2005, for U.S. Appl. No. 09/788,148, filed Feb. 16, 2001.

Response filed Jan. 6, 2006, for U.S. Appl. No. 09/788,148, filed Feb. 16, 2001.

Office Action mailed Mar. 13, 2006, for U.S. Appl. No. 09/788,148, filed Feb. 16, 2001.

* cited by examiner

GENERATION OF QUALITY FIELD INFORMATION IN THE CONTEXT OF IMAGE PROCESSING

BACKGROUND OF THE INVENTION

The present invention generally pertains to image processing. More specifically, the present invention relates to methods and procedures for analyzing biometric image information and generating a corresponding quality field estimate.

Image identification systems have been used in the past, one application being biometric image identification systems. One type of biometric image identification system is a fingerprint identification system. In one example of a fingerprint identification system, a user places the tip of a finger on a scanning surface of a fingerprint image reader device. Each ridge of the epidermis (outer skin) is dotted with sweat glands that produce moisture that, in combination with oily secretions and other substances naturally present on the tip of a finger, enable an image of a fingerprint to be scanned. Alternatively, in some instances, images can be generated from readers that do not rely on the moisture content of the skin to capture an image (e.g., some systems simply capture a picture of print ridge characteristics). Regardless of the precise image collection means, collected image information is commonly compared to a database of stored information for verification, authentication, or some other form of analysis.

Security systems that implement fingerprint identification technology have the potential of being reliable and easy to use. These benefits arise from the fact that the technology does not require a system user to retain any piece of knowledge, such as a password, personal identification number, combination or any other code. Neither must a user possess a card, key or any other physical device to gain access to a secured environment. A fingerprint security authentication key, as opposed to a knowledge or possession based security authentication key, is nearly impossible to lose, steal, or be forgotten.

Development of practical security system applications that incorporate fingerprint image identification technology has been hindered by a general non-repeatability of data from one image scan to another. In particular, physical variations present in the environment of a fingerprint reader device can cause substantial incongruities from one image scan of a fingerprint as compared to a subsequently taken image scan of the same fingerprint. Differences in the temperature, amount of pressure applied to the scanning surface, moisture content of the finger, as well as the effects of medications and differences in blood pressure can all contribute to substantial incongruities from one image scan to another. These and other types of inconsistencies have the potential to throw off image analysis and comparison algorithms, which can lead to inaccurate results.

Accordingly, inconsistency has the potential to hinder the development of fingerprint identification technology applications. Inconsistent data can lead to an unacceptably high number of false acceptances (multiple identifications including matching to wrong individuals) and false rejections (not recognizing an enrolled individual). Security applications that require instantaneous and unsupervised comparisons to be made between a scanned fingerprint image and a database of fingerprint images or fingerprint models often have a low tolerance for inconsistency.

A processing component known to be a part of some image data analysis algorithms is the generation of quality field information, which in the context of fingerprint images includes information pertaining to the quality of the underlying image. For example, a fingerprint image and/or portion thereof will be of low quality if scratches, wet or dry spots, etc., distort the image. The accuracy of current methods for estimating quality field information is relatively limited. Since quality field estimation information is commonly utilized as a processing sub-component of an image analysis system, a limited accuracy in the context of a quality field estimate can compromise the accuracy of the overall image analysis process, thereby contributing to inconsistent overall results.

SUMMARY OF THE INVENTION

A computer-implemented method is provided for generating a quality field representation of a collection of image data. The method includes receiving the collection of image data and identifying a target point along a ridge in the collection of image data. A directional field representation is estimated by assigning an angle value to the ridge indicative of an angle with respect to a reference line. Also, a covariance between the target point and a corresponding point along a line orthogonal to the angle value is calculated.

In another aspect, a method of processing image data is provided. The method includes identifying a plurality of minutiae points within the image data. Quality values are assigned to each of the plurality of minutiae points. Each quality value is assigned by calculating a covariance between each respective minutiae point and a corresponding point displaced from each respective minutiae point.

DETAILED DESCRIPTION OF ILLUSTRATIVE EMBODIMENTS

I. Illustrative Contextual Environments

Various aspects of the present invention pertain to image analysis processes and biometric security systems. The concepts of the present invention can be implemented in conjunction with a broad range of general security applications, including but not limited to physical access security applications, computer network security applications, individual computer security applications, Internet based applications and systems, as well as other security applications. The methods and systems of the present invention are also generally suitable for improving the performance and reliability of image analysis and user authentication systems.

Embodiments of the present invention can be implemented to support systems that restrict access to secure data. Embodiments can also or alternatively be implemented to support systems that enhance security provided in association with a variety of access points. Some of these access points are associated with a physical space, such as a building, a room, a particular airport terminal, an airplane, etc.

In accordance with one embodiment, a biometric scanner is physically positioned within an unsecured area, while access to a separated secured area is denied to anyone who is unable to present authorized biometric information to a biometric scanner for processing by an associated access control program. In accordance with another embodiment, a biometric scanner is physically positioned on an unsecured side of a locked door that remains locked until authorized biometric information is received by a biometric scanner and adequately processed by an associated access control program.

Embodiments of the present invention can also be implemented to support systems that enhance security provided in association with electronic access points. Through interaction with a computing device, a user is able to encounter a wide variety of functional and informational access points or transaction access points, most all of which can potentially be secured with systems that incorporate the methods of the present invention.

A potentially securable electronic access point is encountered when a user is presented with an ability to gain general access to a particular computer network (e.g., a particular LAN, the Internet, etc.). Another potentially securable electronic access point is encountered when a user is presented with an ability to access a particular collection of information (e.g., medical records, account information, personnel information, protected data files, etc.) that is stored on the computing device with which the user is interacting, or is accessibly stored on a remote computing device. Another potentially securable electronic access point is encountered when a user is presented with an ability to access and operate a particular program that is stored on the computing device with which the user is interacting, or is accessibly stored on a remote computing device. Still other potentially securable electronic access points are encountered when a user is presented with an ability to access information stored within a particular file or directory, or an ability to access a class of information that is identified in a particular manner (e.g., confidential), or an ability to utilize functions associated with another independent device (e.g., a particular camera, scanner, cash drawer, vault, etc). These are only a few of many applicable examples of electronic access points.

It should also be noted that embodiments of the present invention are useful in the context of various types of biometric technology. Specific technologies include iris or retina eye-scan technology, voice technology, face technology, hand geometry technology, DNA technology, spectral biometric technology and fingerprint technology, for example. To the extent that the present description describes a fingerprint-based system, such description is intended to be but one example of a suitable system. The scope of the present invention is not so limited.

II. Illustrative Operational Environment

Figure 1:
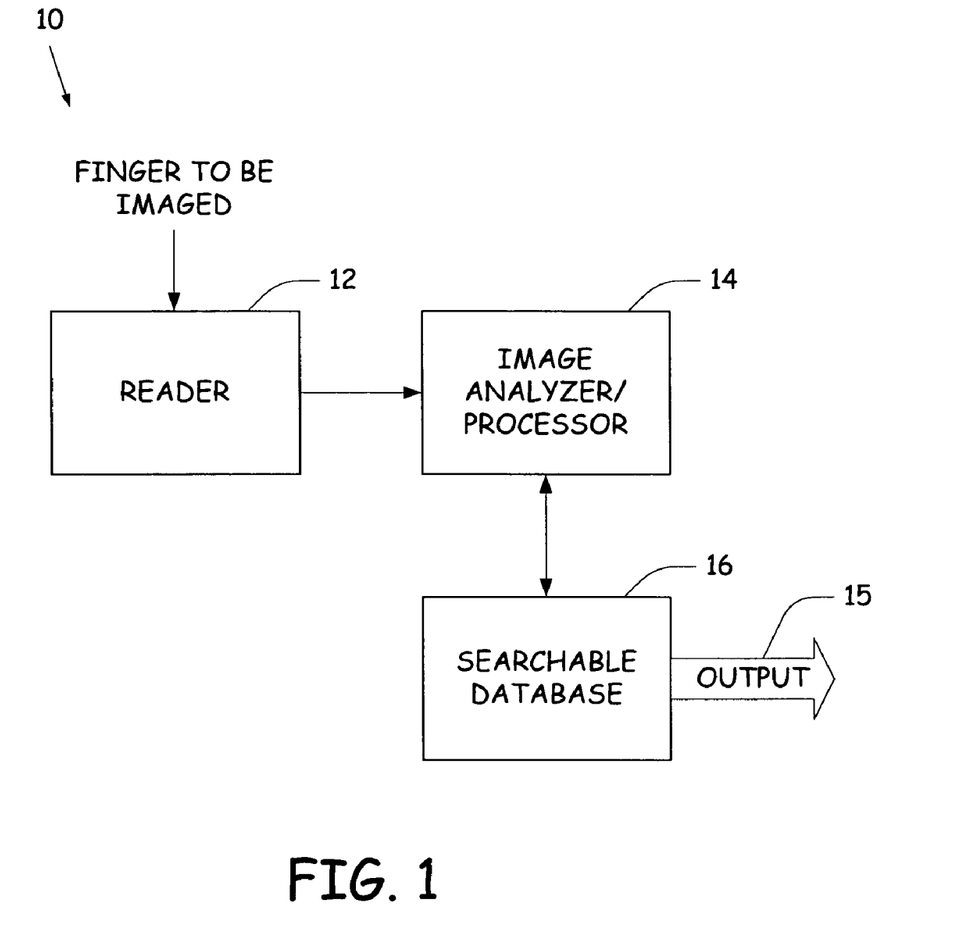
FIG. 1 is a block diagram of a user authentication system.

FIG. 1 is a block diagram of a user authentication system 10. User authentication system 10 includes a reader portion 12, image analyzer/processor 14 and searchable database 16, which further includes an output 15. Reader portion 12 can be any of a number of known systems capable of scanning an image of a fingerprint and transferring data pertaining to the image to an image analyzer, such as image analyzer/processor 14.

In many cases, reader portion 12 will include an optical or electronic device that includes a platen designed to receive the finger to be imaged. A digitized image of biometric information is produced. The reader commonly uses light or electricity to image the finger's pattern. The digitized image is transferred out of reader portion 12 to image analyzer/processor 14. Image analyzer/processor 14 varies with application, but generally analyzes the image data received for a wide variety of purposes and applications.

Image analyzer/processor 14 is illustratively configured to create an authentication model (a.k.a., image model) based on the particular features and characteristics of images received from reader portion 12. In accordance with one embodiment, authentication models are more than facsimiles of their associated fingerprint images and include a unique range of data elements that provide various analytical opportunities.

In one embodiment, image analyzer/processor 14 directly or indirectly compares data elements of a generated authentication model to data elements of at least one other authentication model stored within searchable database 16. The authentication models stored in database 16 illustratively correspond to previously obtained scanned images, while the authentication model being compared illustratively corresponds to a contemporaneously scanned image. User authentication system 10 is configured to efficiently make a determination as to whether the authentication model corresponding to the contemporaneously scanned fingerprint is substantially similar to any of the authentication models (or directly related data collections) included within the searchable database 16. In this manner, user authentication system 10 provides an efficient and accurate fingerprint image identification system. Such a system is used, for instance, as a security measure to determine whether the person who places a finger on the reader portion 12 should be authorized to enter a room, to access a bank account or to take any other variety of actions.

As is shown in FIG. 1, searchable database 16 includes an output 15. The precise nature of output 15 depends on the context within which user authentication system 10 is to be applied. For instance, output 15 could be a positive or negative match indication, or an identification indicator of an authentication model or data collection contained in searchable database 16 that substantially matches or corresponds to the image scanned by reader portion 12. These are but several examples of the many potential forms of output 15. In addition, output 15 can include data to be communicated to an application.

III. Operational Overview

Figure 2:
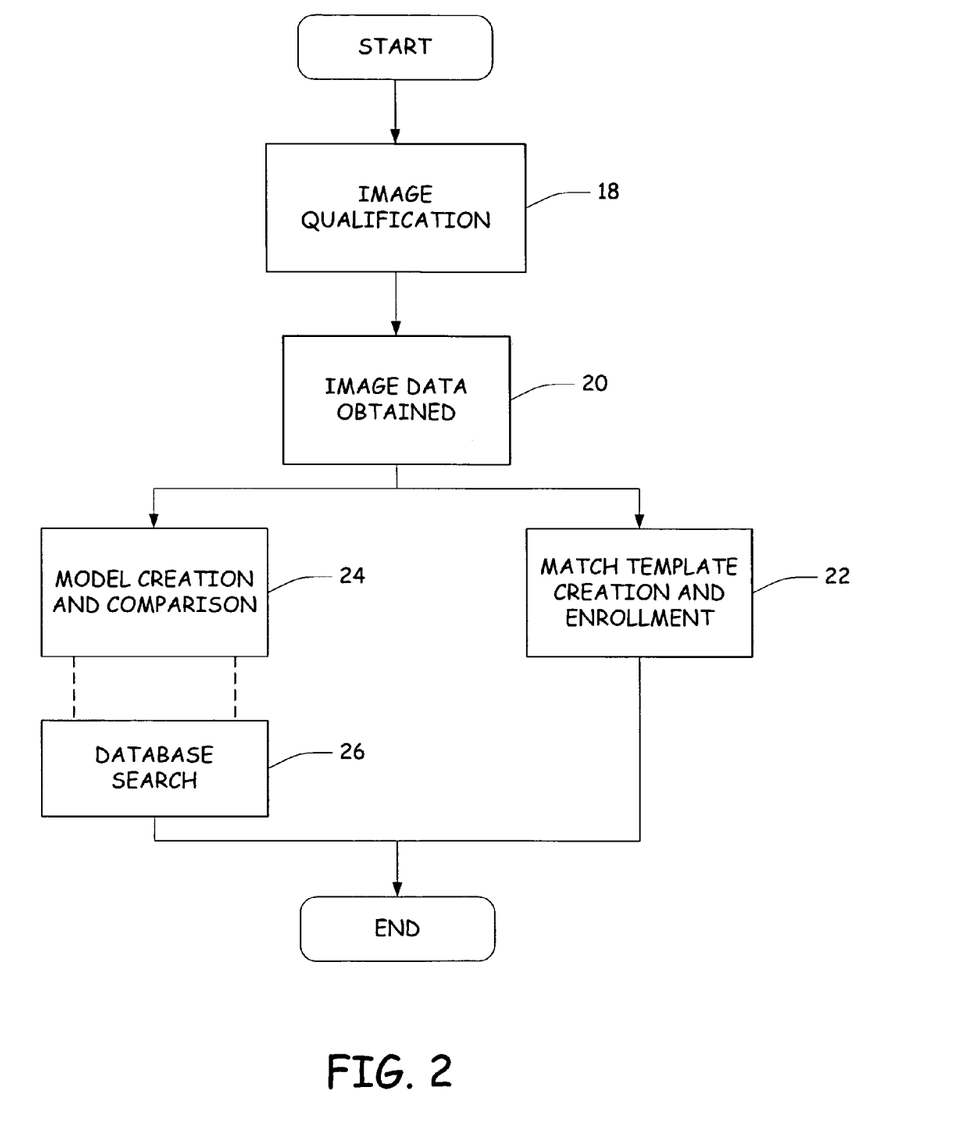
FIG. 2 is a flow diagram illustrating steps associated with analyzing or processing image data.

FIG. 2 is a flow diagram illustrating operations to be carried out within system 10, for example within analyzer/processor 14, in accordance with an embodiment of the present invention. The process begins when image analyzer/processor 14 receives image data from reader portion 12. After receiving image data, image analyzer/processor 14 illustratively first performs, as is indicated by block 18 in FIG. 2, a series of image qualification functions. The image qualification functions are illustratively optional.

Briefly, image qualification 18 involves quickly processing all or part of the available image data to ensure that the received image is a scan of a real fingerprint (as opposed to a fraudulent fingerprint) and of sufficient quality to proceed with processing. In one embodiment, if the image qualification process leads to the conclusion that the scanned image is fraudulent or of insufficient quality, then processing of the image is interrupted. In such a case, the system user is provided with feedback pertaining to identified inadequacies and is allowed to continue processing only when the inadequacies have been corrected.

Block 20 in FIG. 2 represents the point at which qualified image data has been obtained. After qualified image data has been obtained, the image data is utilized for at least one of two purposes, namely, enrollment and authentication. Block 22 represents the enrollment process during which match templates are generated (i.e., based on digitized qualified image data) and entered into, and illustratively catalogued within, searchable database 16. Block 24 represents the authentication process that includes comparing data associated with an invocation of biometric data with stored data for the purpose of determining whether access should be granted or denied.

In accordance with one embodiment, data representations generated during processes 22 and 24 are generated in accordance with the same algorithm, or two substantially similar algorithms, such that they are produced in the same, or a substantially similar, format. In accordance with one embodiment; however, substantially different but related algorithms are utilized. Accordingly, the generated data representations are related but not identical. This enables an indirect, relationship-based comparison process during authentication.

As is indicated by block 26 in FIG. 2, a database search 26 can be performed in association with model comparison 24 to determine which, if any, of multiple match templates stored in the searchable database adequately match a data representation generated during the authentication of a "live" invocation. Illustratively, database search 26 is a quick and efficient determination as to which, if any, of potentially thousands, or even millions, of enrollment templates (or data collections related thereto) within database 16 exhibit a desired level of similarity, as compared to a target representation of a "live" invocation. Searching can be done by biometric information alone, or by some identifier like employee ID, User ID, account number, etc. In accordance with one embodiment, an identifier (i.e., an employee ID, User ID, account number, etc.) is utilized to select a single collection of data from database 16 to be compared to a target representation of a "live" invocation on a one-to-one basis.

In accordance with one embodiment, a set of database keys that describe different match template characteristics are defined to facilitate general rather than specific comparisons to be made during the database search 26 process.

IV. Image Analysis/Model Generation

Figure 3:
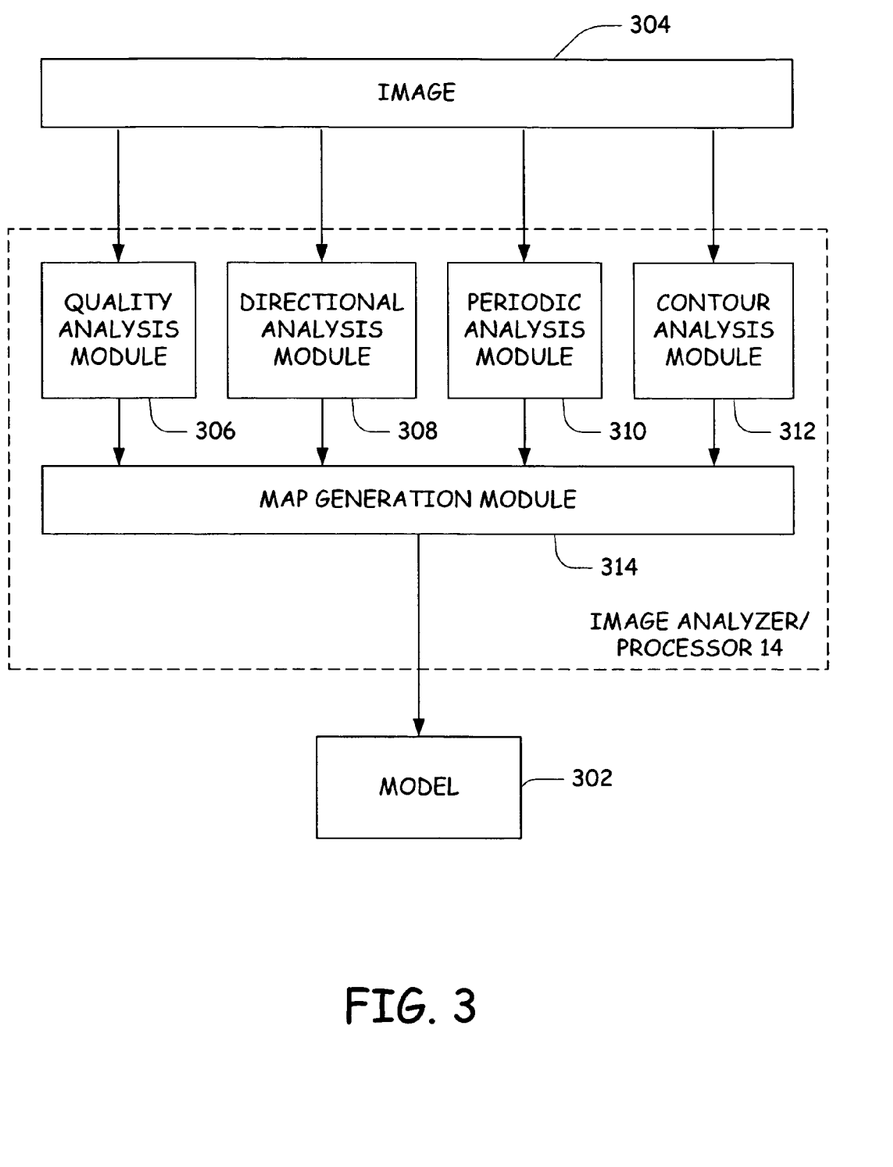
FIG. 3 is a simplified flow diagram illustrating steps associated with generating an image data model.

As was alluded to above, one example of a function performed by image analyzer/processor 14 is generation of a model based on collected image data. FIG. 3 is a simplified process flow diagram illustrating generation of a model 302 that corresponds to received image data 304.

The general concept of generating a model based on collected image data is known in the art. However, there are many different known process for generating a model. In accordance with the process illustrated in FIG. 3, at least four different types of data are generated by four different modules 306–312 and contribute to the process of model creation, which is illustratively carried out by a model generation module 314. In accordance with one embodiment, one or more of the data types generated by modules 306–312 is processed by module 314 in order to create an enhanced or filtered image based on the collected image data 304. The enhanced or filtered image is then processed by module 314 during the generation of the model 302.

As is illustrated, the types of data utilized in the generation of an enhanced image and/or model can include data related to the quality of image data 304. The types of data can also include fingerprint-related data such as the contour or periodic occurrence of ridges and/or valleys. Additionally, the types of data can include data related to changes in the direction of image elements. It should be pointed out that FIG. 3 is intended to be but one broad overview of what one model generation processing system might look like. The present invention generally pertains to methods and processes for providing quality analysis information (e.g., information similar to that produced in association with module 306). Without departing from the scope of the present invention, such methods and systems can be incorporated into any image analysis process including but not limited to the process illustrated in FIG. 3.

V. Quality Analysis

Figure 4:
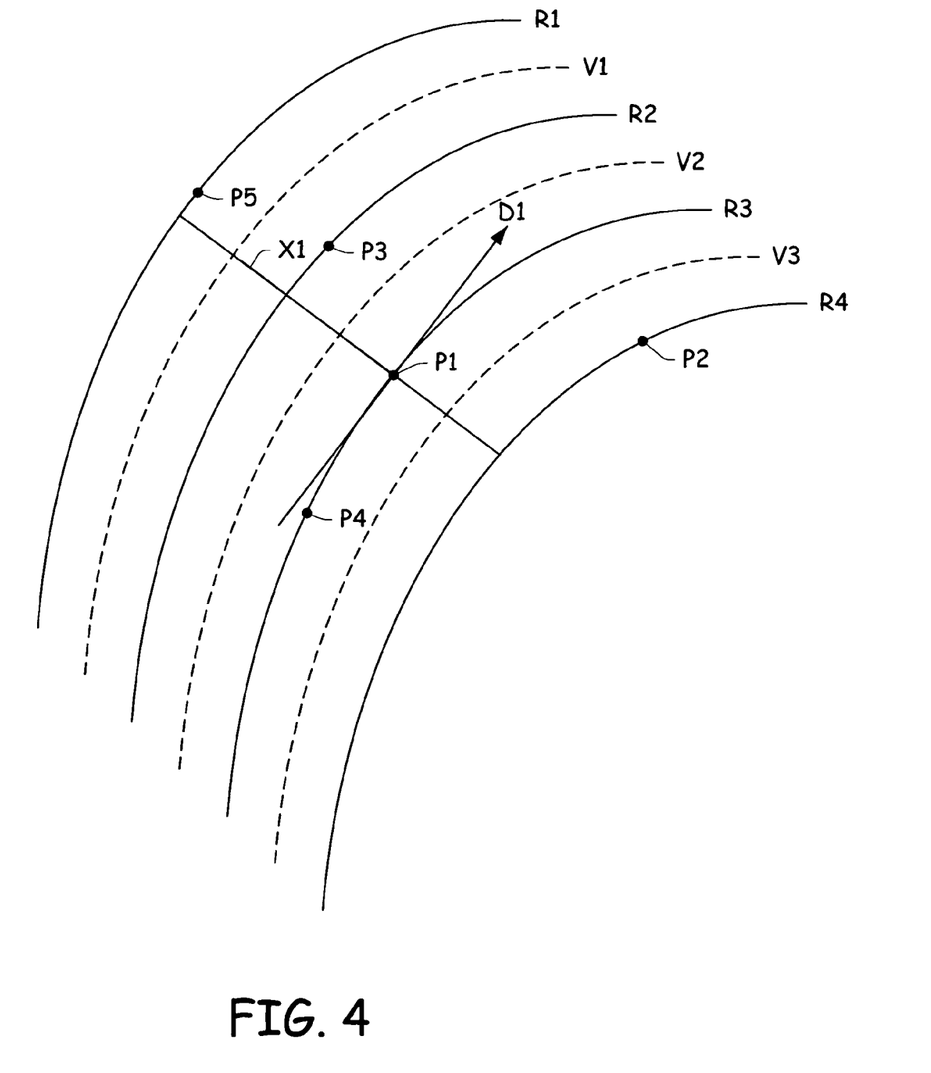
FIG. 4 is a schematic representation of a portion of an image that includes ridge or valley lines.

Various aspects of the present invention pertain to methods for generating quality field information for fingerprint images. Fingerprints generally have a quasi-periodic structure. The structure is defined by a series of ridges and valleys that, when combined, form the fingerprint. FIG. 4 is a schematic representation of a fingerprint image including a plurality of ridges R1–R4 and a plurality of valleys V1–V3. Fingerprint images can be analyzed by identifying various minutiae points and associating information with those minutiae points. In FIG. 4, exemplary minutiae points P1–P5 are illustrated.

Figure 5:
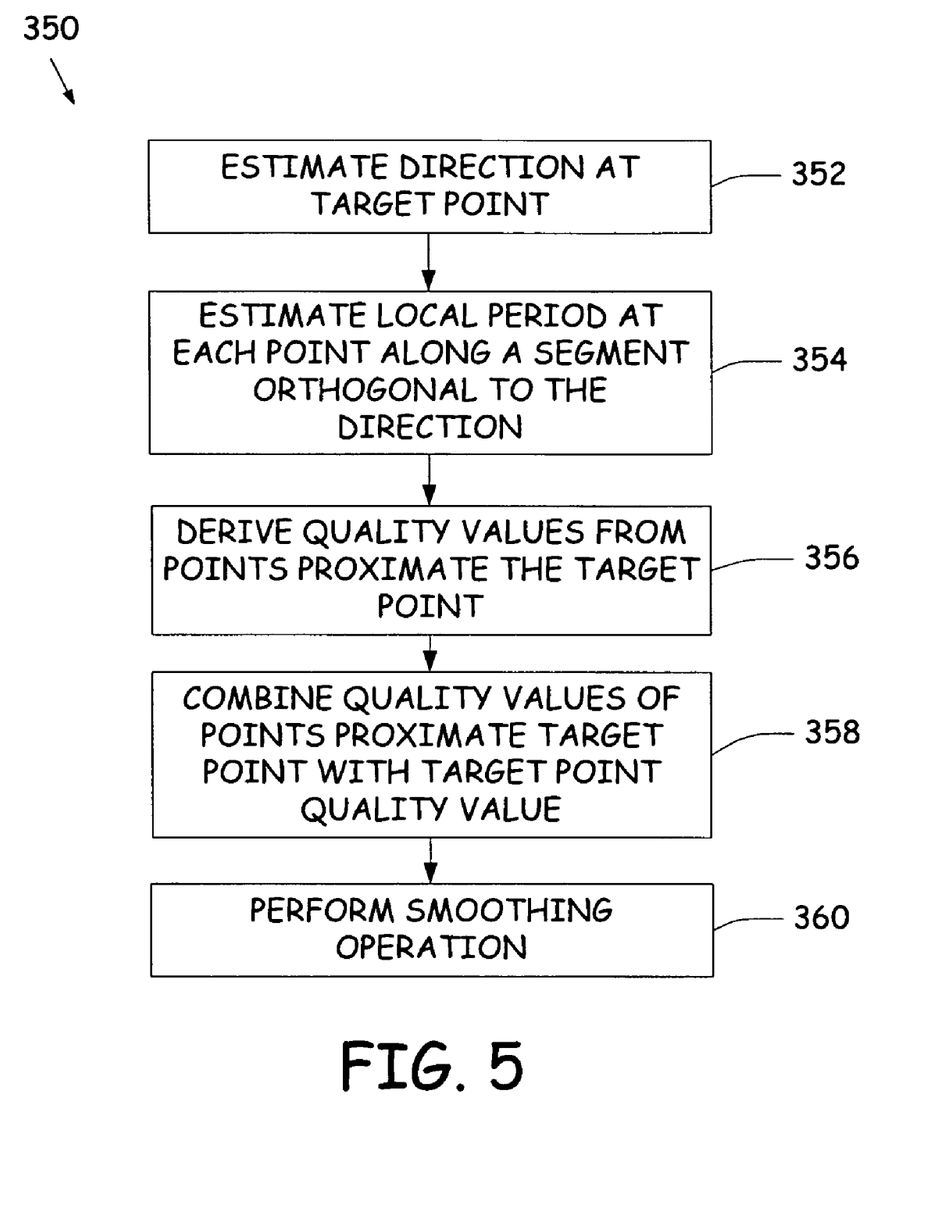
FIG. 5 is a flow diagram illustrating steps associated with assigning a quality field value to a minutiae point.

FIG. 5 is an exemplary method for assigning a quality field value to a minutiae point, such as minutiae point P1 of FIG. 4. The exemplary method 350 will be described with respect to target point P1 in developing a quality value to associate with P1. Method 350 begins at step 352, wherein a direction is estimated at the target point P1. In this case, the direction is illustrated in FIG. 4 as vector D1. As appreciated by those skilled in the art, the direction need not be a vector but can simply be a line oriented tangentially to a ridge associated with the target point. The direction can be represented as a slope of the tangent line with respect to a reference line and can be estimated using a number of different techniques. At step 354, a local period at points along a segment orthogonal to the direction is estimated. The local period value is indicative of the distance between ridges, for example between ridges R1 and R2. With reference to FIG. 4, the local period of points along a segment X1 is estimated. Since fingerprints are generally quasi-periodic structures, the local period for points along a local segment can be a suitable value indicative of the quality of the image, i.e. how closely the image corresponds to being an actual fingerprint. In a particular embodiment, a semi-heuristic approach is used to estimate the period at point P1. The local period along segment X1 is estimated by calculating the covariance of pixel intensity at a point $z_i$ and pixel intensity at an associated point $z_{i+t}$ positioned along X1 that is displaced an interval t from point $z_i$. Thus the covariance can be expressed as:

$$\sum_{i=-n}^{n} x_i x_{i+t}, \qquad (1)$$

where $x_i = z_i - A$ is the normalized intensity (A is the average intensity on segment X1).

An interval t is selected that is indicative of the period, which can be expressed as:

$$T = \arg\max \mathrm{cov}_t \qquad (2)$$

In equation 2, T is the local period value. A quality value of $Q_{P1}$ is then calculated using equation 1 with T as the interval.

At step 356, other quality values can be derived from points proximate the target point P1. For example, the quality values of P2–P5 in FIG. 4 can be calculated using the process described above with respect to steps 352 and 354. At step 358, the quality values of the points proximate the target point and the quality value of the target point are combined in order to define a more precise value of $Q_{P1}$. There are several different ways to combine these quality values. For example, the quality values can be averaged, a median value can be selected, low/high quality values can be ignored, etc. At step 360, a smoothing operation can be performed in accordance with various smoothing techniques.

The quality value calculated can be used in various ways including providing an input for calculating a directional field of a minutiae point, a periodic field at a minutiae point and/or defining a contour of a fingerprint image. In one embodiment, minutiae of insufficient quality will not have their respective directional fields or periodic fields calculated to save on processing time and reduce noise from entering into a model. The quality field values can further be used to generate a contour for the fingerprint image. To define a contour, minutiae points with quality value below a selected threshold can be used to define a boundary for the fingerprint image.

The quality field can further be used in model creation and matching. For example, quality values can be used to weight calculations of other values. These calculations of minutiae points with higher quality values will have a greater weight both during creation and matching of models. A similarity score indicative of the similarity of different models can be computed that utilizes the quality values during matching of different models. As a result, artifacts that distort a fingerprint image such as scratches, wet/dry spots, etc., will have a reduced effect during both model creation and matching. Noise created by these artifacts are prevented from populating the models created from a fingerprint image. Thus, a model created using the process illustrated in FIG. 3 is more reliable.

Although the present invention has been described with reference to preferred embodiments, workers skilled in the art will recognize that changes may be made in form and detail without departing from the spirit and scope of the invention.

What is claimed is:

1. A computer-implemented method for generating a quality field representation of a collection of image data, the method comprising:

receiving the collection of image data;

identifying a target point along a ridge in the collection of image data;

estimating a directional field representation by assigning an angle value to the ridge indicative of an angle with respect to a reference line;

calculating a covariance between the target point and a corresponding point along a line orthogonal to the angle value; and calculating quality values of a plurality of points proximate the target point and calculating the quality field representation based on the quality values.

2. The method of claim 1 and further comprising:

calculating an average among the quality values and the quality field representation and assigning the quality field representation based on the average.

3. A computer-implemented method for generating a quality field representation of a collection of image data, the method comprising:

receiving the collection of image data;

identifying a target point along a ridge in the collection of image data;

estimating a directional field representation by assigning an angle value to the ridge indicative of an angle with respect to a reference line;

calculating a covariance between the target point and a corresponding point along a line orthogonal to the angle value; and calculating at least one of a period field representation and a directional field representation of the target point using the quality field representation.

4. A method of processing image data, comprising:

identifying a plurality of minutiae points within the image data; and assigning quality values to each of the plurality of minutiae points, wherein each quality value is assigned by calculating a covariance between each respective minutiae point and a corresponding point displaced from each respective minutiae point and determining whether each covariance is indicative of a quasi-periodic structure.

5. A method of processing image data, comprising:

identifying a plurality of minutiae points within the image data;

assigning quality values to each of the plurality of minutiae points, wherein each quality value is assigned by calculating a covariance between each respective minutiae point and a corresponding point displaced from each respective minutiae point; and calculating at least one of periodic values and direction values for each of the plurality of minutiae points based on the quality values.

6. The method of claim 5 and further comprising:

generating a model indicative of the image and including the quality values and the at least one of periodic values and direction values for the plurality of minutiae points.

7. The method of claim 6 and further comprising:

comparing the model with another model to determine a similarity measure.

* * * * *